(12) United States Patent
Seo et al.

(10) Patent No.: US 10,175,695 B2
(45) Date of Patent: Jan. 8, 2019

(54) APPARATUS AND METHOD FOR CONTROLLING PARKING-OUT OF VEHICLE

(71) Applicant: HYUNDAI MOTOR COMPANY, Seoul (KR)

(72) Inventors: Min Wook Seo, Suwon-si (KR); Sung Yun Kim, Seoul (KR); Jun Soo Kim, Seoul (KR); Jin Ho Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 25 days.

(21) Appl. No.: 15/465,196

(22) Filed: Mar. 21, 2017

(65) Prior Publication Data

US 2018/0120853 A1 May 3, 2018

(30) Foreign Application Priority Data

Oct. 31, 2016 (KR) .......................... 10-2016-0143073

(51) Int. Cl.
  *B60W 30/06* (2006.01)
  *G05D 1/02* (2006.01)
  *B62D 15/02* (2006.01)

(52) U.S. Cl.
  CPC ........... *G05D 1/0212* (2013.01); *B60W 30/06* (2013.01); *B62D 15/0285* (2013.01)

(58) Field of Classification Search
  CPC .............. B60W 30/06; B62D 15/027–15/0285
  See application file for complete search history.

(56) References Cited

U.S. PATENT DOCUMENTS

2014/0032031 A1  1/2014  Okamura et al.
2014/0156148 A1  6/2014  Kikuchi
(Continued)

FOREIGN PATENT DOCUMENTS

JP   2012-176747 A   9/2012
JP   2014-034322 A   2/2014
(Continued)

OTHER PUBLICATIONS

Korean Office Action dated Mar. 28, 2018 issued in Korean Patent Application No. 10-2016-0143073.
(Continued)

*Primary Examiner* — Genna M Mott
(74) *Attorney, Agent, or Firm* — McDermott Will & Emery LLP

(57) ABSTRACT

An apparatus and a method for controlling parking-out of a vehicle are provided. The apparatus includes a determination processor configured to determine whether a turn switch is operated while autonomous parking of the vehicle is in progress, a mode converter configured to convert an operation mode of the vehicle from a parking mode to a parking-out mode if it is determined that the turn switch is operated while the autonomous parking of the vehicle is in progress and determine a parking-out direction in response to the operation of the turn switch, a path generator configured to generate a parking-out path based on a parking progress state of the vehicle and the determined parking-out direction when the operation mode is converted into the parking-out mode, and a driving controller configured to control the parking-out of the vehicle along the generated parking-out path.

20 Claims, 10 Drawing Sheets

(56) References Cited

U.S. PATENT DOCUMENTS

2014/0244073 A1    8/2014   Okamura et al.
2016/0075331 A1    3/2016   Tomozawa et al.
2016/0371982 A1*  12/2016   Arndt .................... G08G 1/143

FOREIGN PATENT DOCUMENTS

| JP | 2016-060222 A | 4/2016 |
| JP | 2016-060237 A | 4/2016 |
| KR | 10-2013-0028183 A | 3/2013 |
| KR | 10-2014-0036050 A | 3/2014 |
| KR | 10-2014-0105199 A | 9/2014 |
| KR | 10-2014-0130291 A | 11/2014 |

OTHER PUBLICATIONS

Office Action issued in corresponding Korean Patent Application No. 10-2016-0143073, dated Sep. 19, 2017.

* cited by examiner

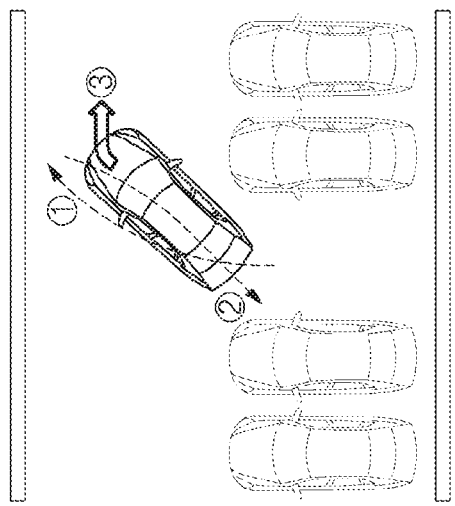
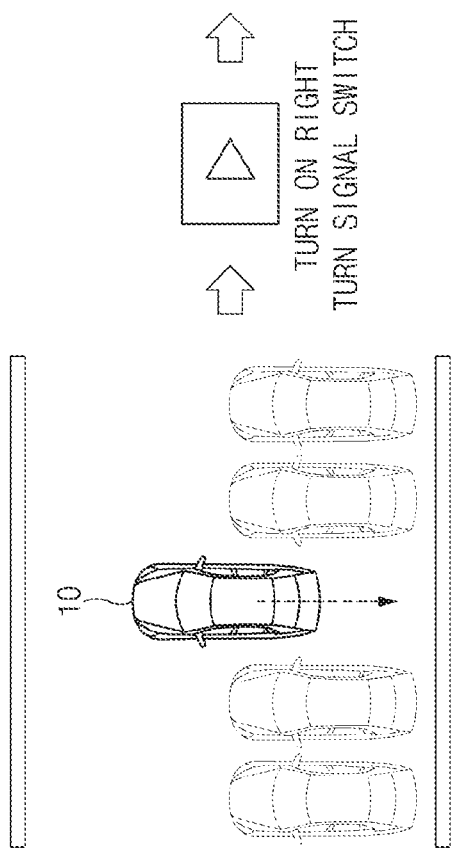
FIG. 3A    FIG. 3B    FIG. 3C

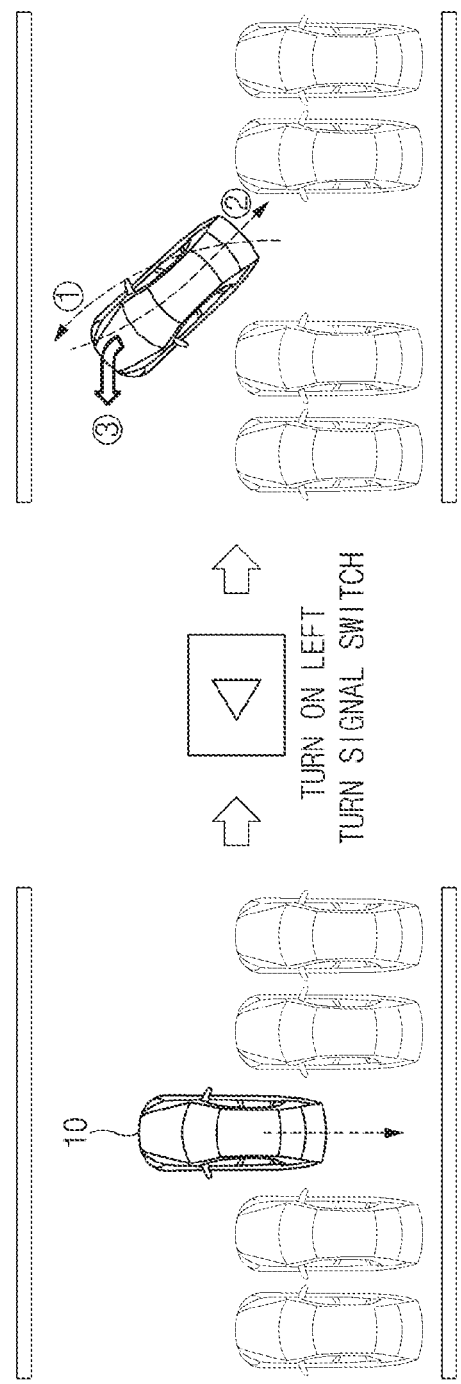

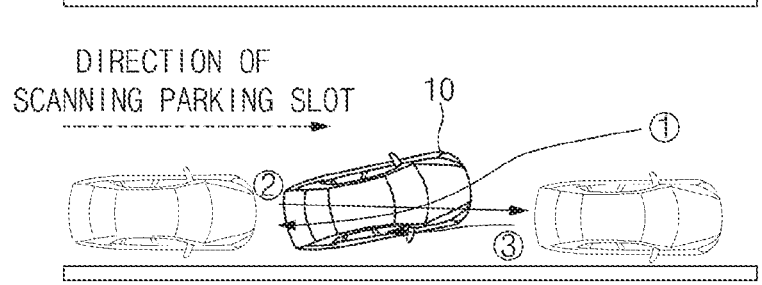
FIG.6A
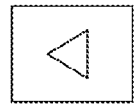
TURN ON LEFT
TURN SIGNAL SWITCH
FIG.6B
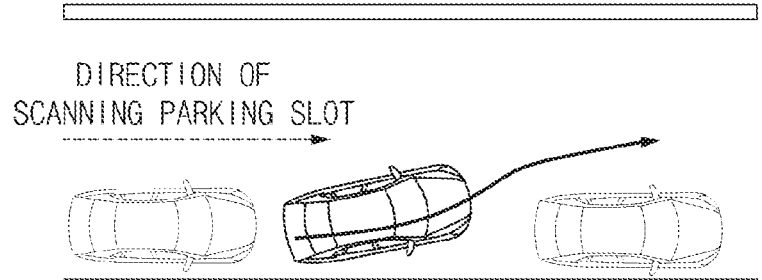
FIG.6C

TURN ON RIGHT
TURN SIGNAL SWITCH

APPARATUS AND METHOD FOR CONTROLLING PARKING-OUT OF VEHICLE

CROSS-REFERENCE TO RELATED APPLICATION

This application is based on and claims the benefit of priority to Korean Patent Application No. 10-2016-0143073, filed on Oct. 31, 2016 with the Korean Intellectual Property Office, the disclosure of which is incorporated herein in its entirety by reference.

BACKGROUND

Technical Field

The present disclosure relates to apparatuses and methods for controlling a vehicle exiting a parking slot (hereinafter referred to as "parking-out").

Discussion of the Related Art

Recently, technologies of guiding a vehicle to enter or exit a parking slot by mounting an autonomous parking assist system on the vehicle and verifying an environment around the vehicle using the autonomous parking assist system have been developed.

If a driver of the vehicle requests autonomous parking and selects a parking type, the autonomous parking assist system executes the autonomous parking based on the parking type selected by the driver.

Also, if the driver requests autonomous parking-out, the autonomous parking assist system executes the autonomous parking-out based on a parking-out direction selected by the driver.

To execute parking-out while autonomous parking is in progress, conventional autonomous parking assist systems execute autonomous parking-out only if a driver requests parking-out again after the autonomous parking is completed and selects a parking-out direction.

In this case, the driver should wait until the autonomous parking is completed in order to proceed the park-out and select a parking-out request and a parking-out direction, resulting in, for example, operating switches or buttons several times.

SUMMARY OF THE DISCLOSURE

The present disclosure has been made to solve the above-mentioned problems of the prior art while advantages achieved by the prior art are remained intact.

An aspect of the present disclosure is to provide an apparatus and method for controlling parking-out of a vehicle to execute autonomous parking-out in the direction of a turn signal switch operated by a multi-function switch while the autonomous parking is in progress.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus may include: a determination processor configured to determine whether a turn switch is operated while autonomous parking of a vehicle is in progress, a mode converter configured to convert an operation mode of the vehicle from a parking mode to a parking-out mode if it is determined that the turn switch is operated while the autonomous parking of the vehicle is in progress and determine a parking-out direction in response to the operation of the turn switch, a path generator configured to generate a parking-out path based on a parking progress state of the vehicle and the determined parking-out direction when the operation mode is converted into the parking-out mode, and a driving controller configured to control parking-out of the vehicle along the generated parking-out path.

According to another aspect of the present disclosure, a method may include: determining whether a turn switch is operated while autonomous parking of the vehicle is in progress, converting an operation mode of the vehicle from a parking mode to a parking-out mode if it is determined that the turn switch is operated while the autonomous parking of the vehicle is in progress and determining a parking-out direction in response to the operation of the turn switch, generating a parking-out path based on a parking progress state of the vehicle and the determined parking-out direction when the operation mode is converted into the parking-out mode, and controlling parking-out of the vehicle along the generated parking-out path.

BRIEF DESCRIPTION OF THE DRAWINGS

The above and other objects, features and advantages of the present disclosure will be more apparent from the following detailed description taken in conjunction with the accompanying drawings:

FIGS. 2, 3A, 3B, 3C, 4, 5A, 5B, 5C, 6A, 6B, 6C, 7A, 7B, and 7C are drawings illustrating parking-out operations in a parking-out control apparatus of a vehicle according to an embodiment of the present disclosure;

DETAILED DESCRIPTION

Figure 1:
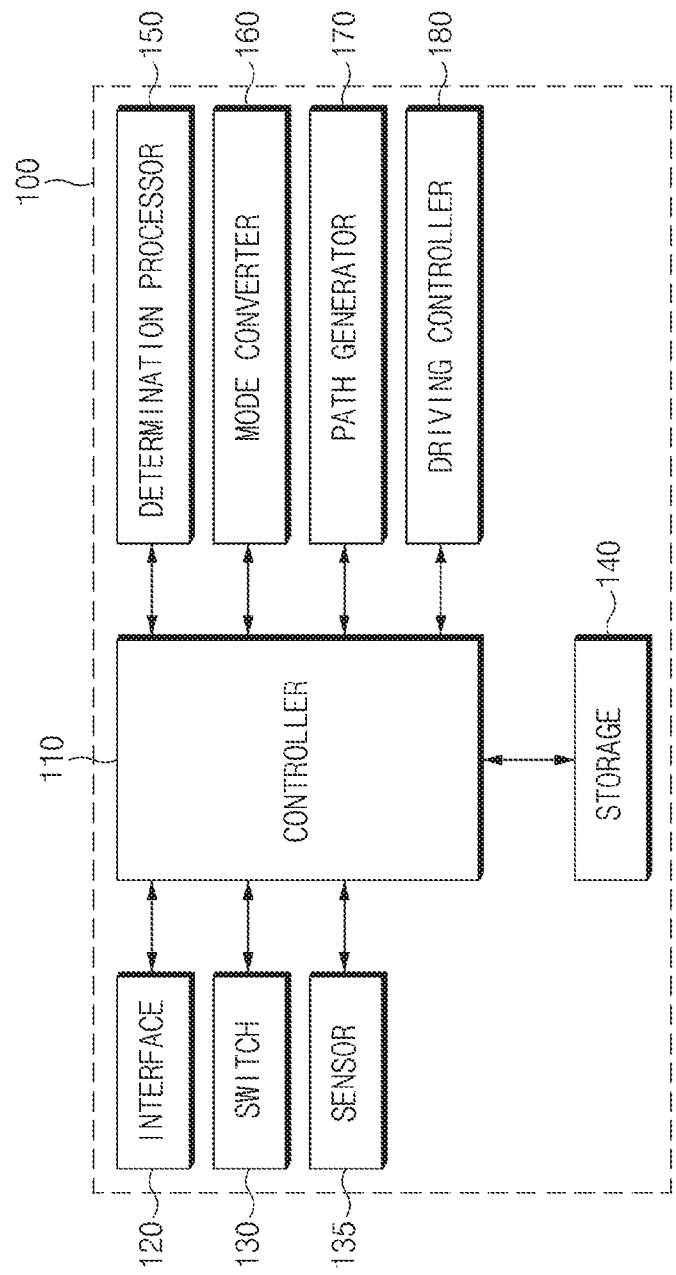
FIG. 1 is a block diagram illustrating a configuration of a parking-out control apparatus of a vehicle according to an embodiment of the present disclosure.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of a parking-out control apparatus of a vehicle according to an embodiment of the present disclosure.

Referring to FIG. 1, a parking-out control apparatus 100 of a vehicle may be implemented in the vehicle. In this case, the parking-out control apparatus 100 of the vehicle may be integrated with controllers in the vehicle. Alternatively, the parking-out control apparatus 100 may be independently implemented from the controllers in the vehicle and may be connected with the controllers of the vehicle by a separate connection means. The parking-out control apparatus 100 of the vehicle may operate in conjunction with a drive such as an engine and/or a motor and the like of the vehicle, and may operate in conjunction with a controller which controls an operation of the engine or motor. Also, the parking-out control apparatus 100 of the vehicle may operate in conjunction with a parking assistance system of the vehicle.

Referring to FIG. 1, the parking-out control apparatus 100 of the vehicle may include a controller 110, an interface 120, a switch 130, a sensor 135, a storage 140, a determination processor 150, a mode converter 160, a path generator 170, and a driving controller 180. Herein, the controller 110 may process a signal transmitted between components of the parking-out control apparatus 100 of the vehicle.

The interface 120 may include an input means for receiving a control instruction from a driver of the vehicle and an output means for outputting an operation state, an operation result, and the like of the parking-out control apparatus 100.

Herein, the input means may include a key button and may further include a mouse, a joystick, a jog shuttle, a stylus pen, and the like. Also, the input means may include a soft key implemented on a display of the vehicle.

The output means may include the display and may further include a voice output means such as a speaker. In this case, if a touch sensor such as a touch film, a touch sheet, or a touch pad is installed in the display, the display may operate as a touch screen and may be implemented in the form of integrating the input means with the output means.

In this case, the display may include at least one of a liquid crystal display (LCD), a thin film transistor-LCD (TFT-LCD), an organic light-emitting diode (OLED), a flexible display, a field emission display (FED), and a three-dimensional (3D) display.

The switch 130 may play a role in transmitting an instruction to indicate a turn in a first direction or a second direction while the vehicle is moved. Herein, the switch 130 may include a multi-function switch in the vehicle.

In this case, the switch 130 may include a first turn switch for indicating a turn in the first direction and a second turn switch for indicating a turn in the second direction. For example, the first turn switch may be a left turn switch, and the second turn switch may be a right turn switch.

The sensor 135 may detect an obstruction located around the vehicle and may include one or more sensors for measuring a distance between the vehicle and the corresponding obstruction. Herein, the one or more sensors may be used to scan a parking slot around the vehicle in a parking mode. Also, the one or more sensors may be used to verify a parking-out space and whether the vehicle collides with an obstruction in a parking-out mode. For example, the sensor 135 may include an ultrasonic sensor, a scanner, a camera, and the like. In addition, the sensor 135 may include a sensor which may detect an obstruction and may measure a distance between the obstruction and the vehicle.

The storage 140 may store data and/or an algorithm necessary for operating the parking-out control apparatus 100 of the vehicle.

The storage 140 may store an algorithm for scanning a parking space, generating a path, and processing autonomous parking and/or autonomous parking-out. The storage 140 may store the result of executing the corresponding algorithm. Also, the storage 140 may store condition information for converting an operation mode into the parking mode or the parking-out mode and may store a control instruction for an operation of the parking mode or the parking-out mode.

Herein, the storage 140 may include storage media such as a random access memory (RAM), a static RAM (SRAM), a read-only memory (ROM), a programmable ROM (PROM), and an electrically erasable PROM (EEPROM).

If an autonomous parking request occurs by the driver, the mode converter 160 may convert an operation mode into the parking mode. In this case, the controller 110 may control an operation of each of the sensor 135, the path generator 170, and the driving controller 180 to control the autonomous parking of the vehicle.

In other words, if the autonomous parking request occurs, the sensor 135 may drive a sensor and may scan a parking slot around the vehicle. The path generator 170 may generate a parking path in consideration of a location and posture of the vehicle, a location of a parking slot, and the like. In this case, the driving controller 180 may execute the autonomous parking along the parking path generated by the path generator 170.

The determination processor 150 may determine whether the first turn switch or the second turn switch is operated while the autonomous parking is in progress in the parking mode. The determination processor 150 may send the determined result to the controller 110.

If it is determined that the first turn switch or the second turn switch is not operated while the autonomous parking is in progress, the controller 110 may send the determined result to the driving controller 180. In this case, the driving controller 180 may execute the autonomous parking based on a parking control algorithm until the autonomous parking is completed.

Meanwhile, if it is determined that the first turn switch or the second turn switch is operated while the autonomous parking is in progress, the controller 110 may send information about whether the first turn switch or the second turn switch is operated and information about the operated switch to the mode converter 160. In this case, the mode converter 160 may convert an operation mode from the parking mode to a parking-out mode based on the information sent from the controller 110. Also, the mode converter 160 may determine a parking-out direction based on whether the operated switch is the first turn switch or the second turn switch and may set a parking-out type based on the determined parking-out direction.

For example, if the first turn switch in the first direction is operated while the autonomous parking of the vehicle is in progress in a perpendicular parking mode, the mode converter 160 may convert the parking mode into a perpendicular parking-out mode of the first direction (hereinafter referred to as "first mode"). Also, if the second turn switch for a second direction which is opposite to the first direction is operated while the autonomous parking is in progress in the perpendicular parking mode, the mode converter 160 may convert the parking mode into the perpendicular parking-out mode of the second direction (hereinafter referred to as "second mode").

Also, if a direction where the autonomous parking progresses (hereinafter referred to as "parking progress direction") is the first direction and if the first turn switch of the first direction which is the same direction as the parking progress direction is operated while the autonomous parking is in progress in a parallel parking mode, the mode converter 160 may convert the parking mode into a parallel parking-out mode (hereinafter referred to as "third mode").

If converting the parking mode into the first mode, the second mode, or the third mode, the mode converter 160 may output a parking-out guide message via the interface 120.

Meanwhile, if the parking progress direction is the first direction and if the second turn switch of the second direction which is opposite to the parking progress direction is operated while the autonomous parking is in progress in the parallel parking mode, the mode converter 160 may fail to convert the parking mode into a parking-out mode. In this case, the mode converter 160 may output a message for notifying parking-out to be impossible via the interface 120.

When an operation mode is converted into the parking-out mode by the mode converter 160, the path generator 170 may generate a parking-out path in a parking-out direction based on a parking-out progress state and a parking-out direction of the vehicle.

Herein, the parking progress state of the vehicle may be classified into a primary reverse stage, a secondary forward stage, and a tertiary reverse stage.

If an operation mode is converted into the first mode or the third mode and if a parking progress state is the first reverse state or the secondary forward stage before the operation mode is converted into the first mode or the third mode, the path generator 170 may generate a reference parking-out path in a reverse order of a parking path generated in the parking mode.

In this case, the controller 110 may turn on a sensor of the sensor 135. In this case, the path generator 170 may generate an environment map based on the result sensed by the sensor 135. Also, the path generator 170 may correct the reference parking-out path based on the environment map. Herein, the path generator 170 may determine the corrected path as a parking-out path.

Meanwhile, if the operation mode is converted into the first mode or the third mode, and if a parking progress state is the tertiary reverse stage before the operation mode is converted into the first mode or the third mode or if the operation mode is converted into the second mode, the path generator 170 may wait until a parking-out space is secured. In this case, the driving controller 180 may proceed with parking along a previously generated parking path until the parking-out space for parking-out of the vehicle is secured. In this case, if the parking space for the parking-out of the vehicle is secured, the path generator 170 may generate a parking-out path in a parking-out direction.

If a parking state is already a parking completion state, the path generator 170 may generate the parking path in the parking-out direction.

If the parking-out path is generated by the path generator 170, the driving controller 180 may execute the autonomous parking-out along the generated parking-out path.

Although not illustrated in FIG. 1, the parking-out control apparatus 100 of the vehicle may further include a communication unit (not shown).

The communication unit may include a communication module for supporting a communication interface with electronics and/or controllers mounted on the vehicle. For example, the communication module may communicatively connect with a display device installed in the vehicle and may send a parking and/or parking-out state of the vehicle to the display device. Also, the communication module may communicatively connect with the switch 130, may receive a signal generated by an operation of the first turn switch or the second turn switch, and may send the received signal to the controller 110.

Herein, the communication module may include a module for supporting vehicle network communication such as a controller area network (CAN), local interconnect network (LIN) communication, and flex-ray communication.

Further, the communication module may include a module for wireless Internet access or a module for short range communication.

FIGS. 2 to 6C are drawings illustrating parking-out operations in a parking-out control apparatus of a vehicle according to an embodiment of the present disclosure.

Figure 2:
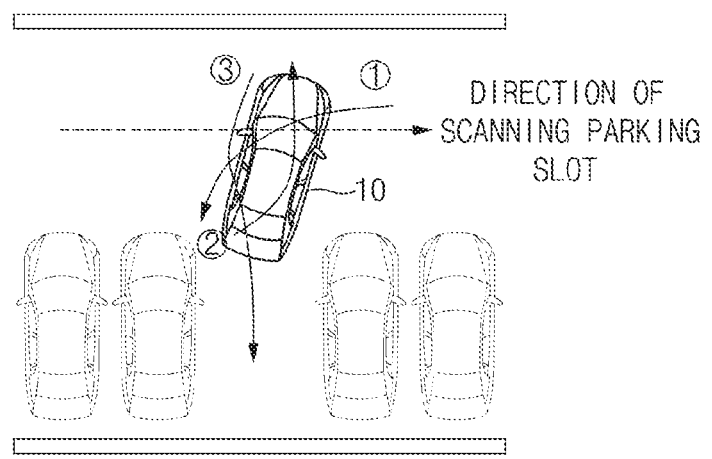

FIG. 2 illustrates an operation of executing autonomous parking. Referring to FIG. 2, if an autonomous parking request occurs by a driver of a vehicle 10, a sensor 135 of FIG. 1 may scan a parking slot in a direction of scanning the parking slot. The path generator 170 of FIG. 1 may generate a parking path (e.g., ①→②→③) for parking in the scanned parking slot.

Thus, a driving controller 180 of FIG. 1 may execute the autonomous parking along the generated parking path (e.g., ①→②→③).

Figure 4:
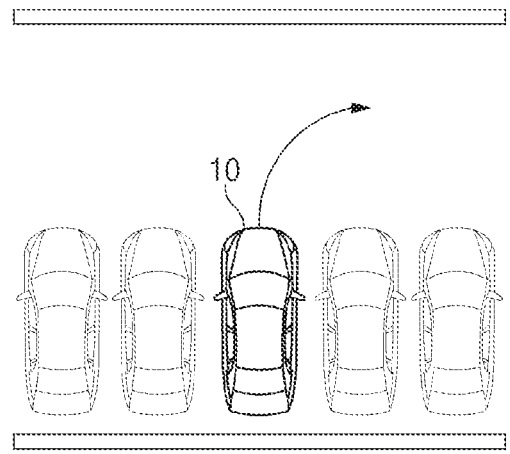

FIGS. 3A to 4 illustrate an embodiment of executing parking-out in the same direction as a parking progress direction during perpendicular parking.

First of all, FIGS. 3A to 3C illustrate an embodiment of executing parking-out in a right direction before perpendicular parking in the right direction is completed.

While autonomous parking of a vehicle 10 is in progress as shown in FIG. 3A, if a right turn signal switch in the same direction as a parking progress direction shown in FIG. 3B is turned on, a parking-out control apparatus 100 of FIG. 1 may convert an operation mode into a parking-out mode and may execute the autonomous parking-out in the right direction.

Herein, the parking-out control apparatus 100 may verify a parking progress state of the vehicle 10 before the autonomous parking progresses. If the parking progress state of the vehicle 10 is a primary reverse stage or a secondary forward stage, the parking-out control apparatus 100 may generate a reference parking-out path in a reverse order of a parking path generated in a parking mode, may generate an environment map based on the result sensed by a sensor operation of a sensor 135 of FIG. 1, and may generate a parking-out path based on the environment map and the reference parking-out path.

Thus, the parking-out control apparatus 100 may execute the autonomous parking along the parking-out path.

Meanwhile, if the parking progress state of the vehicle 10 is a tertiary reverse stage, the parking-out control apparatus 100 may execute the autonomous parking along a previously generated parking path until a parking-out space for parking-out is secured. If the parking-out space is secured as shown in FIG. 3C, the parking-out control apparatus 100 may generate a parking-out path in a parking-out direction and may execute the autonomous parking-out of the vehicle 10 along the parking-out path.

FIG. 4 illustrates an embodiment of executing parking-out in a right direction in a state where perpendicular parking in the right direction is completed.

As shown in FIG. 4, if the perpendicular parking in the right direction is completed, a parking-out control apparatus 100 of FIG. 1 may generate a parking-out path in a parking-out direction, that is, the right direction and may execute autonomous parking-out of a vehicle 10 along the parking-out path.

FIGS. 5A to 5C illustrate an embodiment of executing parking-out in an opposite direction from a parking progress direction during perpendicular parking in a right direction.

While autonomous parking of a vehicle 10 is in progress as shown in FIG. 5A, if a left turn signal switch in a left direction which is opposite to the parking progress direction shown in FIG. 5B is turned on, a parking-out control apparatus 100 of FIG. 1 may execute autonomous parking along a previously generated parking path until a parking-out space for parking-out is secured. If the parking-out space is secured as shown in FIG. 5C, the parking-out control apparatus 100 may generate a parking-out path in a parking-out direction, that is, a left direction and may execute the autonomous parking-out of the vehicle 10 along the parking-out path.

FIGS. 6A to 6C illustrate an embodiment of executing parking-out in the same direction as a parking progress direction during parallel parking in a right direction.

While the parallel parking in the right direction is in progress as shown in FIG. 6A, if a left turn signal switch in a left direction which is the same direction as a parking progress direction is turned on as shown in FIG. 6B, a parking-out control apparatus 100 of FIG. 1 may convert a parking mode into a parking-out mode and may execute autonomous parking in the right direction.

Herein, the parking progress direction is the right direction, or a left direction may be the same direction as the parking progress direction with reference to a vehicle 10. Thus, if the left turn signal switch is turned on during parallel parking in the right direction, it may be understood that the parking-out control apparatus 100 progresses parking-out in the same direction as the parking progress direction.

In this case, the parking-out control apparatus 100 may verify a parallel parking progress state of the vehicle 10 before executing autonomous parking. If the parallel parking progress state of the vehicle 10 is a primary reverse stage or a secondary forward stage, the parking-out control apparatus 100 may generate a reference parking-out path in a reverse order of a parking path generated in a parking mode, may generate an environment map based on the result sensed by a sensor operation of a sensor 135 of FIG. 1, and may generate a parking-out path based on the environment map and the reference parking-out path.

Thus, as shown in FIG. 6C, the parking-out control apparatus 100 may execute autonomous parking-out along the parking-out path.

Figure 7A:
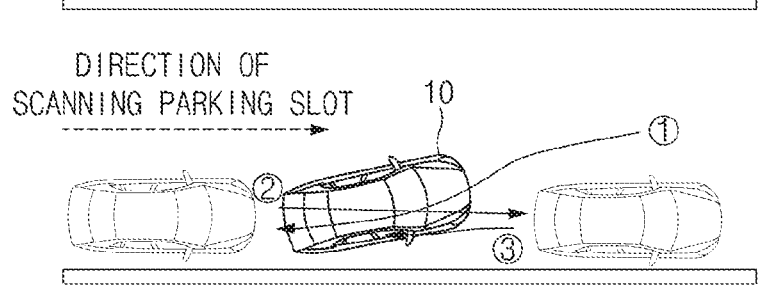
Figure 7B:
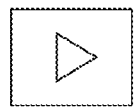
Figure 7C:
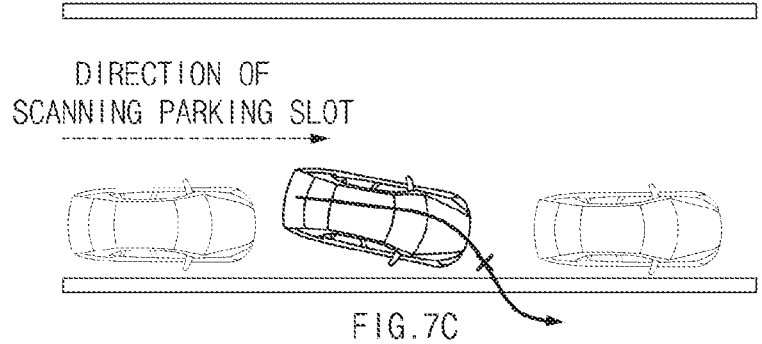

FIGS. 7A to 7C illustrate an embodiment of executing parking-out in an opposite direction from a parking progress direction during parallel parking in a right direction.

While the parallel parking in the right direction progresses as shown in FIG. 7A, a right turn signal switch in an opposite direction from a parking progress direction, that is, the right direction with reference to a vehicle 10 during parallel parking is turned on as shown in FIG. 7B, as shown in FIG. 7C, the vehicle 10 may fail to progress parking-out in the right direction of the vehicle 10.

In this case, a parking-out parking apparatus 100 of FIG. 1 may notify a driver of the vehicle 10 of a message for notifying parking-out to be impossible.

A detailed description will be given of an operation of the above-mentioned components of the parking-out control apparatus 100.

Figure 8:
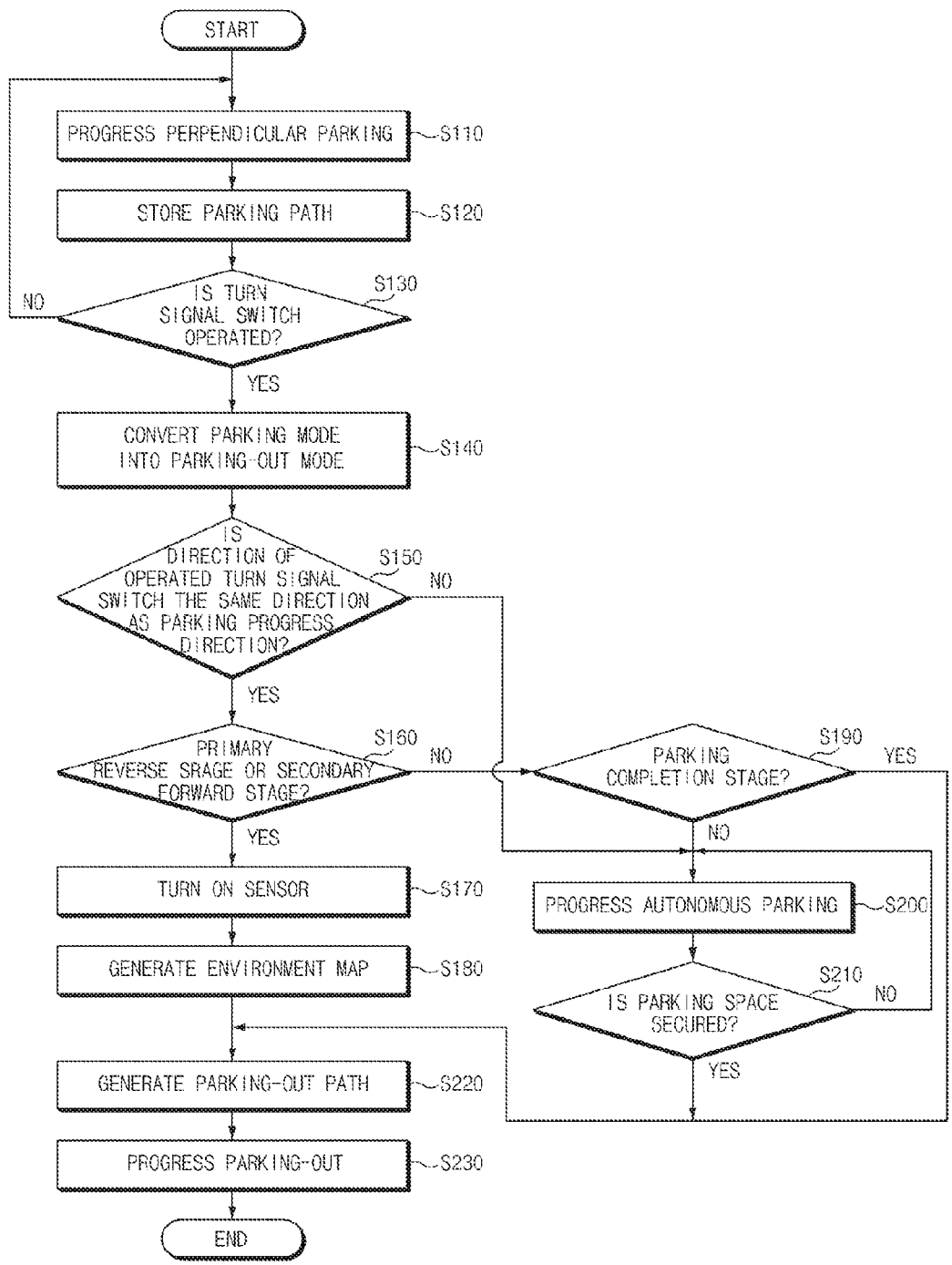
FIGS. 8 and 9 are flowcharts illustrating a parking-out control method for vehicle according to an embodiment of the present disclosure.
Figure 9:
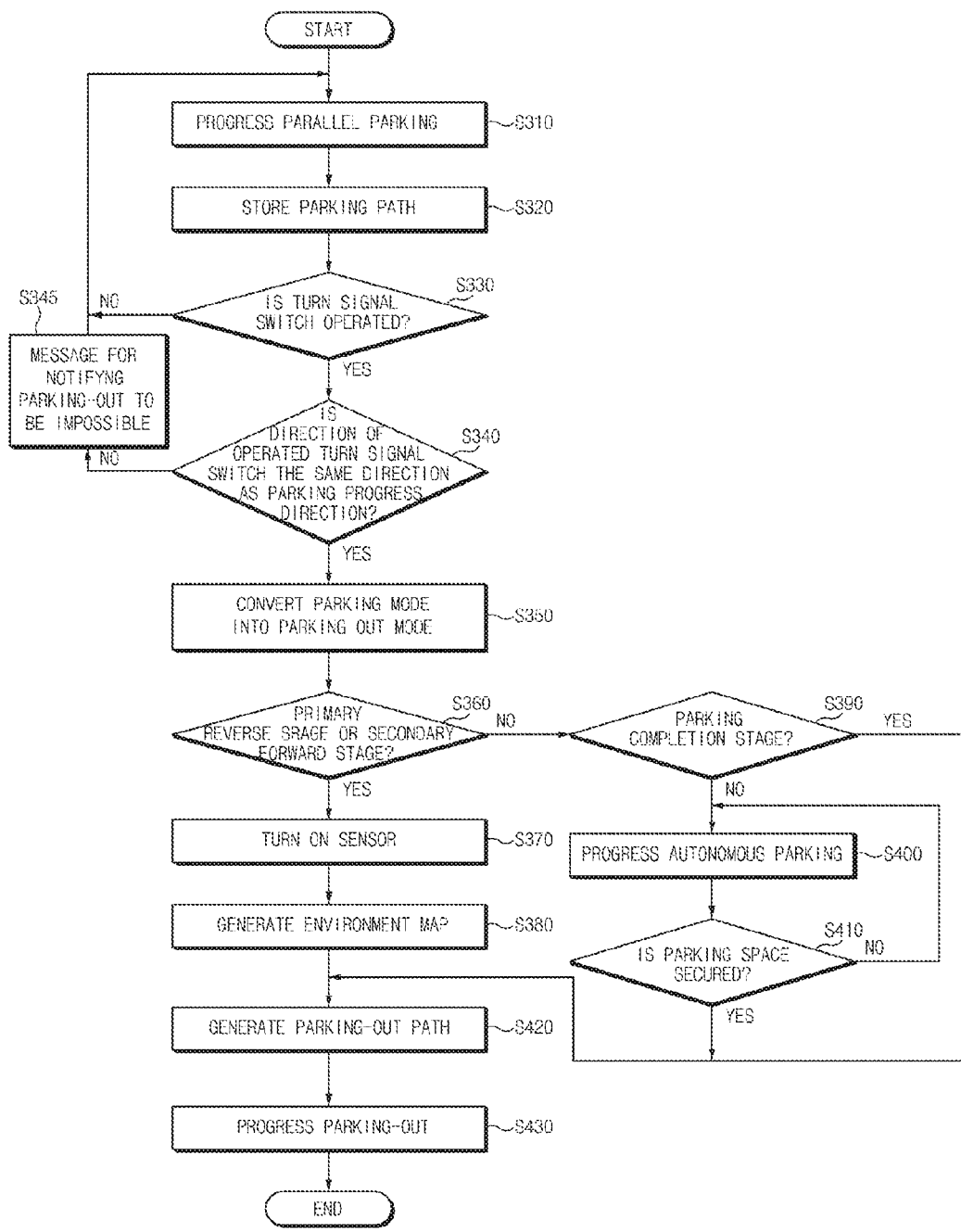

FIGS. 8 and 9 are flowcharts illustrating a parking-out control method of a vehicle according to an embodiment of the present disclosure.

FIG. 8 is a flowchart illustrating an operation of executing parking-out while perpendicular parking is in progress.

As shown in FIG. 8, if executing perpendicular parking along a parking path in operation S110, in operation S120, the parking-out control apparatus 100 of FIG. 1 may store a previously generated parking path.

In operation S130, the parking-out control apparatus 100 may determine whether a turn signal switch is operated while the perpendicular parking is in progress. If the turn signal switch is operated in operation S130, in operation S140, the parking-out control apparatus 100 may convert a parking mode into a parking-out mode. In this case, the parking-out control apparatus 100 may output a parking-out guide message to guide a driver of a vehicle to park out of a parking slot.

In operation S150, the parking-out control apparatus 100 may determine whether a direction of the operated turn signal switch is the same direction as a parking progress direction.

Herein, if determining that the direction of the operated turn signal switch is the same direction as the parking progress direction in operation S150, in operation S160, the parking-out control apparatus 100 may verify a parking progress state of the vehicle. If the parking progress state of the vehicle is a primary reverse stage or a secondary forward stage in operation S160, in operation S170, the parking-out control apparatus 100 may turn on its sensor. In operation S180, the parking-out control apparatus 100 may generate an environment map based on the result sensed by the sensor.

Also, in operation S220, the parking-out control apparatus 100 may generate a reference parking-out path in a reverse order of the parking path stored in operation S120 and may generate a parking-out path based on the environment map generated in operation S180 and the reference parking-out path.

In operation S230, the parking-out control apparatus 100 may execute parking-out along the parking-out path generated in operation S220.

Meanwhile, if the parking progress state of the vehicle is not the primary reverse stage or the secondary forward stage in operation S160, and if the parking progress state of the vehicle is not a parking completion stage in operation S190, that is, if the parking progress state of the vehicle is a tertiary reverse stage, in operation S200, the parking-out control apparatus 100 may execute autonomous parking along a previously generated parking path until a parking-out space is secured. If the parking-out space is secured in operation S210, in operation S220, the parking-out control apparatus 100 may generate a parking-out path in a parking-out direction. In operation S230, the parking-out control apparatus 100 may perform autonomous parking of the vehicle along the parking-out path.

If determining that the direction of the turn signal switch operated in operation S150 is not the same direction as the parking progress direction, in operation S200, the parking-out control apparatus 100 may execute the autonomous parking along the previously generated parking path until the parking-out space is secured. If the parking-out space is secured in operation S210, in operation S220, the parking-out control apparatus 100 may generate the parking-out path in the parking-out direction. In operation S230, the parking-out control apparatus 100 may perform the autonomous parking of the vehicle along the parking-out path.

If determining that the parking progress state of the vehicle is the parking completion stage in operation S190, in operation S220, the parking-out control apparatus 100 may generate the parking-out path in the parking-out direction. In operation S230, the parking-out control apparatus 100 may perform the autonomous parking of the vehicle along the parking-out path.

FIG. 9 is a flowchart illustrating an operation of executing parking-out while parallel parking is in progress.

As shown in FIG. 9, if executing parallel parking progresses along a parking path in operation S310, in operation S320, the parking-out control apparatus 100 of FIG. 1 may store a previously generated parking path.

In operation S330, the parking-out control apparatus 100 may determine whether a turn signal switch is operated while the parallel parking is in progress. If the turn signal switch is operated in operation S330, in operation S340, the parking-out control apparatus 100 may determine whether a direction of the operated turn signal switch is the same direction as a parking progress direction. Herein, if determining that the direction of the operated turn signal switch is the same direction as the parking progress direction in operation S340, in operation S345, the parking-out control apparatus 100 may output a message for notifying parking-out to be impossible to notify a driver of a vehicle of a state of parking-out to be impossible.

If determining that the direction of the turn signal switch operated in operation S340 is the same direction as the parking progress direction, in operation S350, the parking-out control apparatus 100 may convert a parking mode into a parking-out mode. In this case, the parking-out control apparatus 100 may output a parking-out guide message to guide the driver to park out of a parking slot.

In operation S360, the parking-out control apparatus 100 may verify a parking progress state of the vehicle. If the parking progress state of the vehicle is a primary reverse stage or a secondary forward stage in operation S360, in operation S370, the parking-out control apparatus 100 may turn on its sensor. In operation S380, the parking-out control apparatus 100 may generate an environment map based on the result sensed by the sensor.

Also, in operation S420, the parking-out control apparatus 100 may generate a reference parking-out path in a reverse order of the parking path stored in operation S320 and may generate a parking-out path based on the environment map generated in operation S380 and the reference parking-out path.

In operation S430, the parking-out control apparatus 100 may execute parking-out along the parking-out path generated in operation S420.

Meanwhile, if the parking progress state of the vehicle is not the primary reverse stage or the secondary forward stage in operation S360, and if the parking progress state of the vehicle is not a parking completion stage in operation S390, that is, if the parking progress state of the vehicle is a tertiary reverse stage, in operation S400, the parking-out control apparatus 100 may execute autonomous parking along a previously generated parking path until a parking-out space is secured. If the parking-out space is secured in operation S410, in operation S420, the parking-out control apparatus 100 may generate a parking-out path in a parking-out direction. In operation S430, the parking-out control apparatus 100 may perform autonomous parking of the vehicle along the parking-out path.

If determining that the parking progress state of the vehicle is the parking completion stage in operation S390, in operation S420, the parking-out control apparatus 100 may generate the parking-out path in the parking-out direction. In operation S430, the parking-out control apparatus 100 may perform the autonomous parking of the vehicle along the parking-out path.

The parking-out control apparatus 100 according to an embodiment may be implemented in the form of an independent hardware device and may be driven in the form of being included in another hardware device such as a microprocessor or a general purpose computer system as at least one or more processors.

Figure 10:
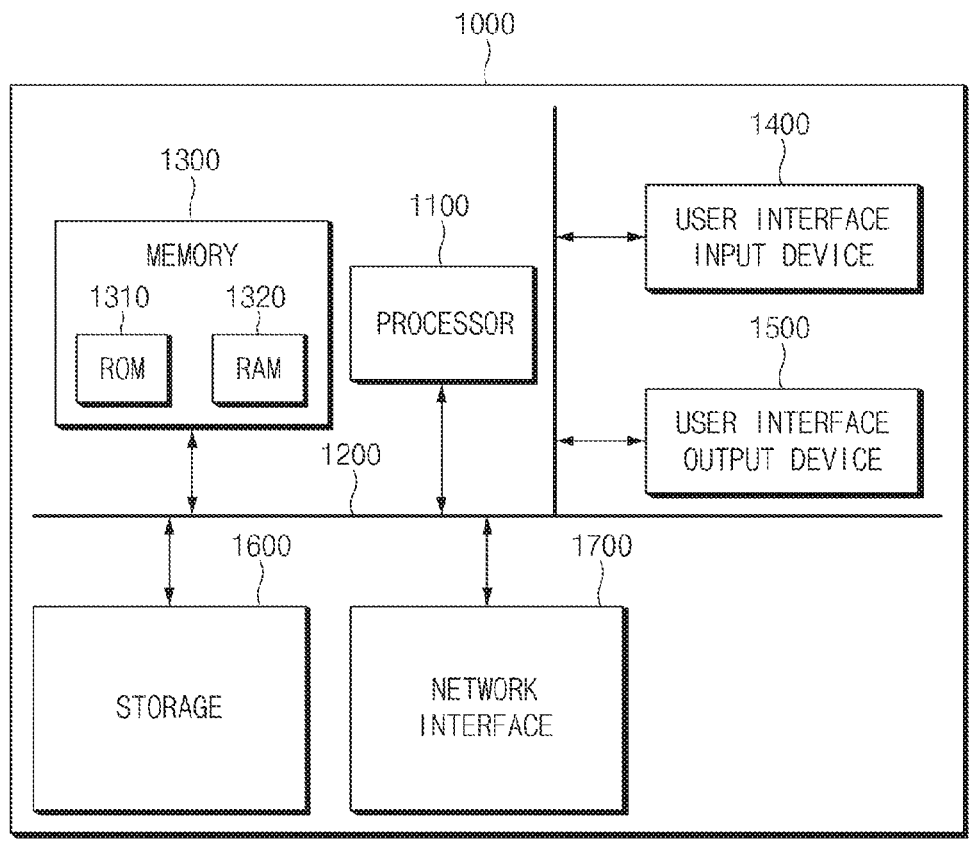
FIG. 10 is a block diagram illustrating a configuration of a computing system to which a parking-out control apparatus is applied, according to an embodiment of the present disclosure.

FIG. 10 is a block diagram illustrating a configuration of a computing system to which a parking-out control apparatus is applied, according to an embodiment of the present disclosure.

Referring to FIG. 10, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

According to various embodiments, a parking-out control apparatus may simply covert an operation mode into a parking-out mode by operating a turn signal switch of a multi-function switch while autonomous parking of a vehicle is in progress. The parking-out control apparatus may increase convenience by autonomously executing parking-out based on a direction of the turn signal switch.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. An apparatus for controlling parking-out of a vehicle, the apparatus comprising:
a memory configured to store program instructions; and
a processor configured to execute the program instructions to:
determine whether a turn switch is operated while autonomous parking of the vehicle is in progress;
convert an operation mode of the vehicle from a parking mode to a parking-out mode if it is determined that the turn switch is operated while the autonomous parking of the vehicle is in progress, and determine a parking-out direction in response to the operation of the turn switch;
generate a parking-out path based on a parking progress state of the vehicle and the determined parking-out direction when the operation mode is converted into the parking-out mode; and
control the parking-out of the vehicle along the generated parking-out path.

2. The apparatus of claim 1, wherein the processor is further configured to:
convert the operation mode into a first mode, if the turn switch for the parking-out of the vehicle in a first direction is operated while perpendicular parking of the vehicle is in progress in the first direction;
convert the operation mode into a second mode, if the turn switch for the parking-out of the vehicle in a second direction which is opposite to the first direction is operated; and
convert the operation mode into a third mode, if the turn switch for the parking-out of the vehicle in the first direction is operated while parallel parking of the vehicle is in progress in the first direction.

3. The apparatus of claim 2, wherein the parking progress state of the vehicle is classified into one of a primary reverse stage, a secondary forward stage, and a tertiary reverse stage, and
wherein the processor is further configured to:
generate a reference parking-out path in a reverse order of a parking path generated during parking, if the operation mode is converted into the first mode or the third mode and if the parking progress state of the vehicle is the primary reverse stage or the secondary forward stage.

4. The apparatus of claim 3, wherein the processor is further configured to:
generate an environment map based on information sensed by a sensor; and
generate the parking-out path by correcting the reference parking-out path with respect to the environment map.

5. The apparatus of claim 3, wherein the processor is further configured to:
wait until a parking-out space is secured, if the operation mode is converted into the first mode or the third mode and if the parking progress state of the vehicle is the tertiary reverse stage; and
generate the parking-out path in the parking-out direction, if the parking-out space is secured.

6. The apparatus of claim 5, wherein the processor is further configured to:
proceed with parking along the previously generated parking path until the parking-out space is secured.

7. The apparatus of claim 3, wherein the processor is further configured to:
wait until a parking-out space is secured, if the operation mode is converted into the second mode; and
generate the parking-out path in the parking-out direction, if the parking-out space is secured.

8. The apparatus of claim 1, wherein the processor is further configured to:
generate the parking-out path in the parking-out direction, if it is determined that the vehicle is in a parking completion state.

9. The apparatus of claim 2, wherein the processor is further configured to:
output a parking-out guide message, if the operation mode is converted into the first mode, the second mode, or the third mode.

10. The apparatus of claim 6, wherein the processor is further configured to:
output a message for notifying the parking-out of the vehicle to be impossible, if the turn switch for parking-out in the second direction is operated while the parallel parking of the vehicle is in progress in the first direction.

11. A method for controlling parking-out of a vehicle, the method comprising:
determining whether a turn switch is operated while autonomous parking of the vehicle is in progress;
converting an operation mode of the vehicle from a parking mode to a parking-out mode if it is determined that the turn switch is operated while the autonomous parking of the vehicle is in progress and determining a parking-out direction in response to the operation of the turn switch;
generating a parking-out path based on a parking progress state of the vehicle and the determined parking-out direction when the operation mode is converted into the parking-out mode; and
controlling parking-out of the vehicle along the generated parking-out path.

12. The method of claim 11, wherein the converting to the parking-out mode comprises:
converting the operation mode into a first mode, if the turn switch for the parking-out of the vehicle in a first direction is operated while the perpendicular parking of the vehicle is in progress in the first direction;
converting the operation mode into a second mode, if the turn switch for the parking-out of the vehicle in a second direction which is opposite to the first direction is operated; and
converting the operation mode into a third mode, if the turn switch for the parking-out of the vehicle in the first direction is operated while parallel parking of the vehicle is in progress in the first direction.

13. The method of claim 12, wherein the parking progress state of the vehicle is classified into one of a primary reverse stage, a secondary forward stage, and a tertiary reverse stage, and
wherein the generating of the parking-out path comprises:
generating a reference parking-out path in a reverse order of a parking path generated during parking, if the operation mode is converted into the first mode or the third mode and if the parking progress state of the vehicle is the primary reverse stage or the secondary forward stage.

14. The method of claim 13, wherein the generating of the parking-out path further comprises:

generating an environment map based on information sensed by a sensor; and generating the parking-out path by correcting the reference parking-out path with respect to the environment map.

15. The method of claim 13, wherein the generating of the parking-out path further comprises:

waiting until a parking-out space is secured, if the operation mode is converted into the first mode or the third mode and if the parking progress state of the vehicle is the tertiary reverse stage; and generating the parking-out path in the first direction, if the parking-out space is secured.

16. The method of claim 15, further comprising:

proceeding with parking along the previously generated parking path until the parking-out space is secured.

17. The method of claim 13, wherein the generating of the parking-out path further comprises:

waiting until a parking-out space is secured, if the operation mode is converted into the second mode; and generating the parking-out path in the second direction, if the parking-out space is secured.

18. The method of claim 11, wherein the generating of the parking-out path further comprises:

generating the parking-out path in the parking-out direction, if it is determined that the vehicle is in a parking completion state.

19. The method of claim 12, further comprising:

outputting a parking-out guide message, if the operation mode is converted into the first mode, the second mode, or the third mode.

20. The method of claim 16, further comprising:

outputting a message for notifying the parking-out of the vehicle to be impossible, if the turn switch for the parking-out of the vehicle in the second direction is operated while the parallel parking of the vehicle is in progress in the first direction.

* * * * *